US011221907B1

(12) United States Patent
Sharma et al.

(10) Patent No.: US 11,221,907 B1
(45) Date of Patent: Jan. 11, 2022

(54) CENTRALIZED SOFTWARE ISSUE TRIAGE SYSTEM

(71) Applicant: Morgan Stanley Services Group Inc., New York, NY (US)

(72) Inventors: Girish Sharma, Pennington, NJ (US); Christopher Mann, Toms River, NJ (US); Alberto Ramos, Milltown, NJ (US); Kiran Arun Karkhanis, Hillsborough, NJ (US); Keith O'Brien, Matawan, NJ (US); Alberto Cira, Tlaquepaque (MX); Angad Sangha, Bengaluru (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 17/159,141

(22) Filed: Jan. 26, 2021

(51) Int. Cl.
*G06F 11/00* (2006.01)
*G06F 11/07* (2006.01)
*G06F 11/36* (2006.01)
*G06F 11/32* (2006.01)

(52) U.S. Cl.
CPC ........ *G06F 11/079* (2013.01); *G06F 11/0793* (2013.01); *G06F 11/321* (2013.01); *G06F 11/3664* (2013.01)

(58) Field of Classification Search
CPC .. G06F 11/079; G06F 11/0793; G06F 11/321; G06F 11/3664
USPC ...................................................... 714/1-57
See application file for complete search history.

(56) References Cited

U.S. PATENT DOCUMENTS

| 5,737,497 | A | * | 4/1998 | Ballard ................... G06F 30/30 706/47 |
| 7,962,736 | B1 | * | 6/2011 | Polyudov ................. G06F 8/65 713/2 |
| 8,898,763 | B1 | | 11/2014 | Mannepalli et al. |
| 8,996,397 | B2 | | 3/2015 | Grace et al. |
| 9,367,810 | B1 | | 6/2016 | Gagne et al. |
| 9,811,795 | B1 | | 11/2017 | Kearns et al. |
| 10,282,667 | B2 | | 5/2019 | Gagne et al. |
| 10,515,323 | B2 | | 12/2019 | Ronen et al. |
| 10,860,451 | B1 | * | 12/2020 | Murthy ................. G06F 11/079 |
| 2002/0165745 | A1 | | 11/2002 | Greene et al. |

(Continued)

*Primary Examiner* — Sarai E Butler
(74) *Attorney, Agent, or Firm* — Weitzman Law Offices, LLC

(57) ABSTRACT

A system for triage and response to a second system's malfunction is disclosed. The system determines a possible present or future disruption to a service provided by the second system; automatically searches historical records regarding similar disruptions; and provides an interactive, aggregated user interface comprising many tools to display results of the search, log actions already taken, and receive commands from human operators for seamless intervention in cloud-based or on-premises systems. The determination may be based on a statistical anomaly in the performance of the second system, or alternatively may be based on input from a human user, whose communication undergoes text analysis to determine possible matches. The user interface is used by multiple operators simultaneously using different computing devices to access the user interface, displays communications from other operators and actions taken by the other operators and can integrate many other tools for a seamless experience regardless of location.

19 Claims, 7 Drawing Sheets

(56) References Cited

U.S. PATENT DOCUMENTS

| | | | |
|---|---|---|---|
| 2002/0169644 A1 | 11/2002 | Greene | |
| 2005/0080696 A1* | 4/2005 | Bagchi | G06Q 10/06 705/35 |
| 2005/0172167 A1* | 8/2005 | Driscoll | H04L 41/0659 714/26 |
| 2006/0064486 A1* | 3/2006 | Baron | H04L 41/5019 709/224 |
| 2006/0112311 A1* | 5/2006 | Cobb | G06F 9/4411 714/16 |
| 2007/0011527 A1* | 1/2007 | Goswami | G01R 31/318583 714/726 |
| 2008/0263404 A1* | 10/2008 | Vidiyala | G06F 11/0748 714/38.14 |
| 2008/0301479 A1* | 12/2008 | Wood | G06F 1/3203 713/322 |
| 2010/0275054 A1 | 10/2010 | Grace et al. | |
| 2011/0264964 A1* | 10/2011 | Murphy | G06F 11/0775 714/48 |
| 2011/0320884 A1* | 12/2011 | Thilagar | G06F 11/0787 714/48 |
| 2012/0144236 A1* | 6/2012 | Black | H04L 43/50 714/25 |
| 2013/0198557 A1* | 8/2013 | Bensinger | G06F 11/1469 714/3 |
| 2013/0246853 A1* | 9/2013 | Salame | G06F 11/0709 714/37 |
| 2014/0301479 A1* | 10/2014 | Pandit | H04N 13/194 375/240.25 |
| 2015/0178180 A1* | 6/2015 | Burghard | G06F 11/3636 714/45 |
| 2016/0124792 A1* | 5/2016 | Togawa | G06F 11/079 714/37 |
| 2016/0124823 A1* | 5/2016 | Ruan | G06F 11/0709 714/26 |
| 2016/0170825 A1* | 6/2016 | Nguyen | G06F 11/0751 714/15 |
| 2016/0308982 A1 | 10/2016 | Greene | |
| 2018/0121322 A1* | 5/2018 | Reyes | G06F 11/3692 |
| 2018/0373578 A1 | 12/2018 | Bridges et al. | |
| 2019/0081479 A1* | 3/2019 | Faley | H02J 3/381 |
| 2020/0050494 A1* | 2/2020 | Bartfai-Walcott | G06F 9/5083 |
| 2020/0226222 A1* | 7/2020 | Jayaraman | G06F 11/3664 |
| 2020/0287813 A1* | 9/2020 | Kutch | H04L 43/16 |
| 2021/0012215 A1* | 1/2021 | Fei | G06F 40/295 |
| 2021/0157312 A1* | 5/2021 | Celia | G06K 9/6263 |

* cited by examiner

CENTRALIZED SOFTWARE ISSUE TRIAGE SYSTEM

FIELD OF INVENTION

This application relates to systems for and methods of automated analysis of computing system and tools to facilitate electronic communication, and more specifically, to systems that anticipate a fault in a secondary system and that enable a team of human users to determine how a secondary system is or may be faulty, communicate with each other to address the actual or anticipated fault, and issue commands to a computing system to recover from or prevent the fault.

BACKGROUND

As enterprise-level computing ecosystems become more complex, a single software bug can take an increasing amount of time to fix, when every second can be worth thousands of dollars to the enterprise due to economic activity prevented or service level agreements violated. An enterprise may provide computing platforms comprising hundreds of software libraries, server-side scripts, and other interconnecting parts, such that a small revision in a single piece of code introduces errors in other, unexpected parts of the system.

Organizations typically use a scattered set of tools to research, communicate, and intervene during a service disruption. A ticket management system may be used to receive input from end users about the issue, an instant messaging application may be used for a group of human operators (including developers, technicians, or other tech personnel) to communicate in real time despite physical distance, a wiki or other knowledge base may store information on past actions taken to resolve disruptions, various analytics programs may be consulted to provide present and past statistics on the system's performance, and a console or terminal program may be used to issue commands to the system. Thus, fixing a software disruption may involve toggling between over a dozen windows on a screen or tabs within a web browser, causing slower resolution of the issue due to task switching and inefficiency in how data is provided and actions are taken Moreover, when time is of the essence, any software-aided augmentation to the natural ability of human operators is appreciated. There is considerable inefficiency in requiring the human operators who first become aware of a bug to determine who within the organization has the subject matter expertise to address the problem and inform them both of the problem and what steps have already been taken to address the situation.

Thus, there are advantages to using a system that speeds triage and resolution of the issue by automatically gathering and curating information provided to human operators, helping human operators communicate with one another, and facilitating the human operators issuing commands back to the system until the software issue is resolved.

SUMMARY OF THE INVENTION

A system for proactively preventing, or facilitating triage and response to, a malfunction in a second system in a connected infrastructure to the first system is disclosed. The system comprises one or more processors, and non-transitory memory comprising instructions. When the instructions are executed by the one or more processors, they cause the one or more processors to: receive a communication indicating a present or possible future disruption to a service provided by the second system within user interface (UI), middle or data tier components; automatically search historical records related to one or more of recent code changes, system errors, related incidents, performance records, or server health checks, regarding similar disruptions to the second system and recorded resolutions to the similar disruptions; return a matching set of historical records indicating a possible response to the present or possible future disruption; and provide an interactive graphical user interface to display the matching set, to log actions already taken to address the present or possible future disruption, and to receive commands from a team of human users to make changes to the second system to address the present or possible future disruption.

The communication indicating a disruption to a service provided by the second system may be generated in response to a statistical anomaly in the performance of the second system compared to past performance, or alternatively may be provided by a human user, whose communication undergoes text analysis to determine possible past disruptions matching the present disruption. The interactive graphical user interface is used by multiple developers simultaneously using different computing devices to access the interactive graphical user interface, and the interactive graphical user interface displays to developers communications from other developers and actions taken by the other developers.

Similarly, a computer-implemented method for proactively preventing, or facilitating triage and response to, a second system's malfunction is disclosed. The method comprises, among other features, receiving a communication indicating a disruption to a service provided by the system; automatically searching historical records regarding similar disruptions to the system and responses to the similar disruptions; returning a matching set of historical records indicating a possible response to the disruption related to recent changes, system errors, related incidents, performance records, recorded resolutions, or server health checks; and providing an interactive graphical user interface to display the matching set, to log actions already taken to address the disruption, and to receive commands from a human team to make changes to the system to address the disruption. These changes may include, among others, an instruction to roll back one or more of the changes to a previous version of the software, shutting down a faulty server, changing the information in a configuration file, adding capacity to computing power, bandwidth, server allocation, or other resources, shutting down or restarting a software process, or contacting a vendor to escalate the issue. Responsive to the instruction, the action is automatically taken.

A method is also disclosed for facilitating triage and response to a system's malfunction, comprising: receiving a set of service level agreement (SLA) requirements to be met by the system; automatically determining that an anomaly in system behavior at runtime indicates the SLA requirements are not being met or are in danger of not being met due to a disruption to a service provided by the system; automatically searching historical records regarding similar disruptions to the system and responses to the similar disruptions; returning a matching set of historical records indicating a possible response to the disruption; and providing an interactive graphical user interface to display the matching set, to log actions already taken to address the disruption, and to receive commands from a developer to make changes to the system to address the disruption.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a system is provided to act as a single point of reference during a service disruption to coordinate and automate responses to the disruption, minimizing the effort needed to research past disruptions and communicate with other developers addressing the disruption. A user interface centers on an instant messaging window that displays communications from other developers, displays information on the functioning and malfunctioning of the system, and permits developers see what steps other developers have taken and to issue commands directly to a chatbot, who can effectuate the commands or respond to queries with information.

Figure 1:
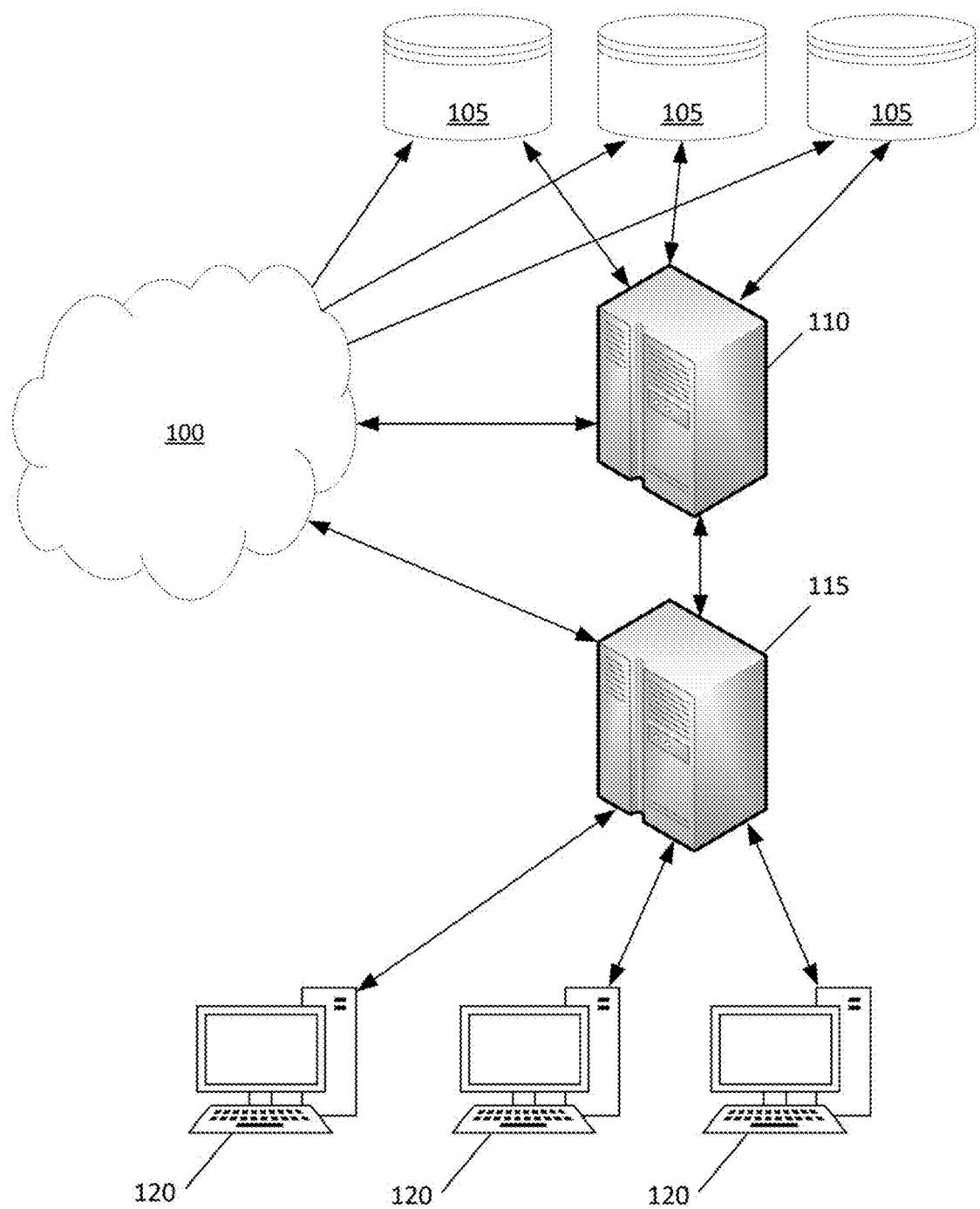
FIG. 1 depicts a network of computing devices to be used in a system for facilitating triage and response to a second system's malfunction.

FIG. 1 depicts a network of computing devices to be used in a system for facilitating triage and response to a second system's malfunction.

An organization may employ a group of developers to maintain some software system 100 that includes one or more interacting computing devices or software modules. For example, system 100 might include a firewall, a load balancer, and a cluster of servers providing various services to all client computers that transmit requests. The system 100 might be a single server with a variety of interacting software libraries, daemons, scripts, or other software modules. The internal topology and parts of the system 100 are not so important as the fact that the system 100 is providing some set of services to users which may, due to a hardware or software failure, be interrupted and need to be restored promptly to full functionality.

A number of databases 105 may be used to store various information about the functioning of the system 100 and the resources available to address any issues. For example, one database may be an issue tracker used to store service tickets requesting help from IT, communications between IT and affected users, a timeline of the issue, and steps taken by IT to address the issue. Another database may store source control for software on the system 100, tracking what the code base of that software contained in each version and the intervals of time during which that code was the version in production. Yet another database may store user logs or other historical information about the use of the system, such as how many users were logged in at given snapshot moments, how long a particular script takes to run in each instance and on average, how many times particular scripts are being called, etc. Yet another database may store past history on versions of software not presently in use in the system 100, but that were used in a development or quality assurance testing environment before being promoted to production, including the source code, reported bugs and bugfixes, and usage information.

An API (application programming interface) server 110 provides a standardized means for other computing devices to query the various databases 105 for information contained therein. For example, an organization may provide via the API server 110 a single point of reference to access information on all software used by the organization within the system 100, the past versions of that software, which developers were involved in creating and maintaining each version, what issues have been reported and resolved with each application, what external dependencies each application has, and what other software of functionalities may depend on each application.

One or more web servers 115 provide a web-based REST (representational state transfer) API to allow commands received via an HTTP request or other protocol to be forwarded to and acted upon by other computing devices in the system 100 or by the API server 110.

Various individual developer computers 120, each used by a particular human software developer, connect to the web server 115 and display either a web-based user interface generated by the web server 115, or use a native client to display information obtained via communication with web server 115. The web server 115 thus acts as a bridge between the developers, the system 100, and the information stored in the databases 105, as elaborated in the description of FIGS. 3-6, below.

Although a particular division of functions between devices is described in the system above, other configurations are possible in which functions are divided among devices differently. For example, all of the functions of the databases 105, the API server 110, and the web server 115 may be performed by a single device with multiple threads executing different software modules simultaneously. Alternatively, each system may in fact be a cluster of computing devices sharing functionality for concurrent processing. The specific number of computing devices and whether communication between them is network transmission between separate computing devices or accessing a local memory of a single computing device is not so important as the functionality that each part has in the overall scheme.

Further, although various computing devices 105, 110, and 115 are described as if they are one computing device or cluster each, a cloud-based solution with multiple access points to similar systems that synchronize their data and are all available as backups to one another is preferable to a unique set of computing devices all stored at one location.

Figure 2:
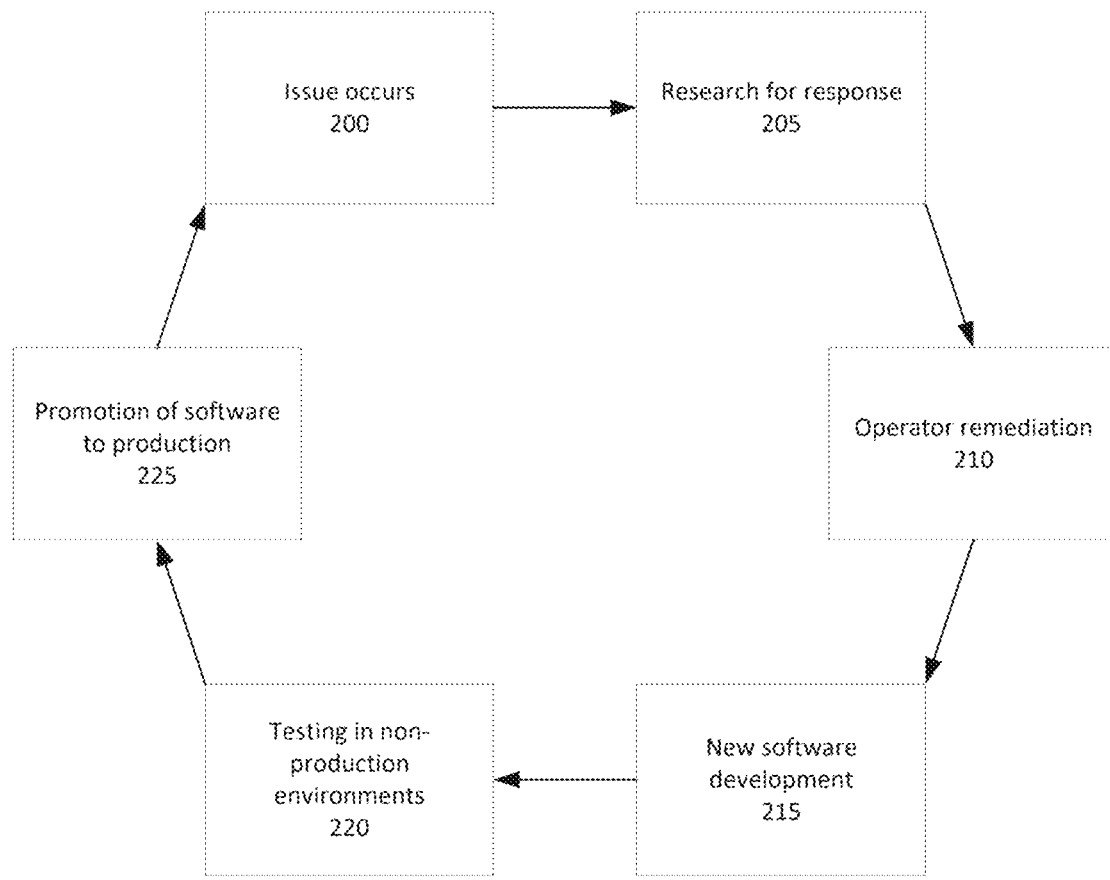
FIG. 2 depicts a software development lifecycle that is facilitated by the presently described systems and methods.

FIG. 2 depicts a software development lifecycle that is facilitated by the presently described systems and methods.

In many software systems, some set of servers will provide consumer/user-facing services, termed the production environment, while another set of servers will mirror the software but be used by developers to add and test new features before being exposed to users in a potentially faulty state.

Whenever an actual or potential issue occurs in production (Step 200), human operators, possibly aided by automated systems, must research to determine the nature of the problem and possible responses to it (Step 205). Then, action can be taken or approved by the human operators to triage and remedy the issue to the extent possible (Step 210). A permanent solution comes from further software development (Step 215) addressing the issue, the results of which are then tested in the non-production environment (Step 220) to review for any issues the new development may introduce. Finally, the corrected software is promoted to production (Step 225), and the operators and developers return to watching for new issues that may arise. In some embodiments, the software may be automatically prevented from being promoted to production until an issue that may cause the actual or potential issue is remedied, such as removing dependency on a deprecated library, or removing similar code that previously caused a similar issue in the testing or production environment. The presently described systems and methods leverage the information learned during past interventions, development, and testing to better address a present issue.

Figure 3:
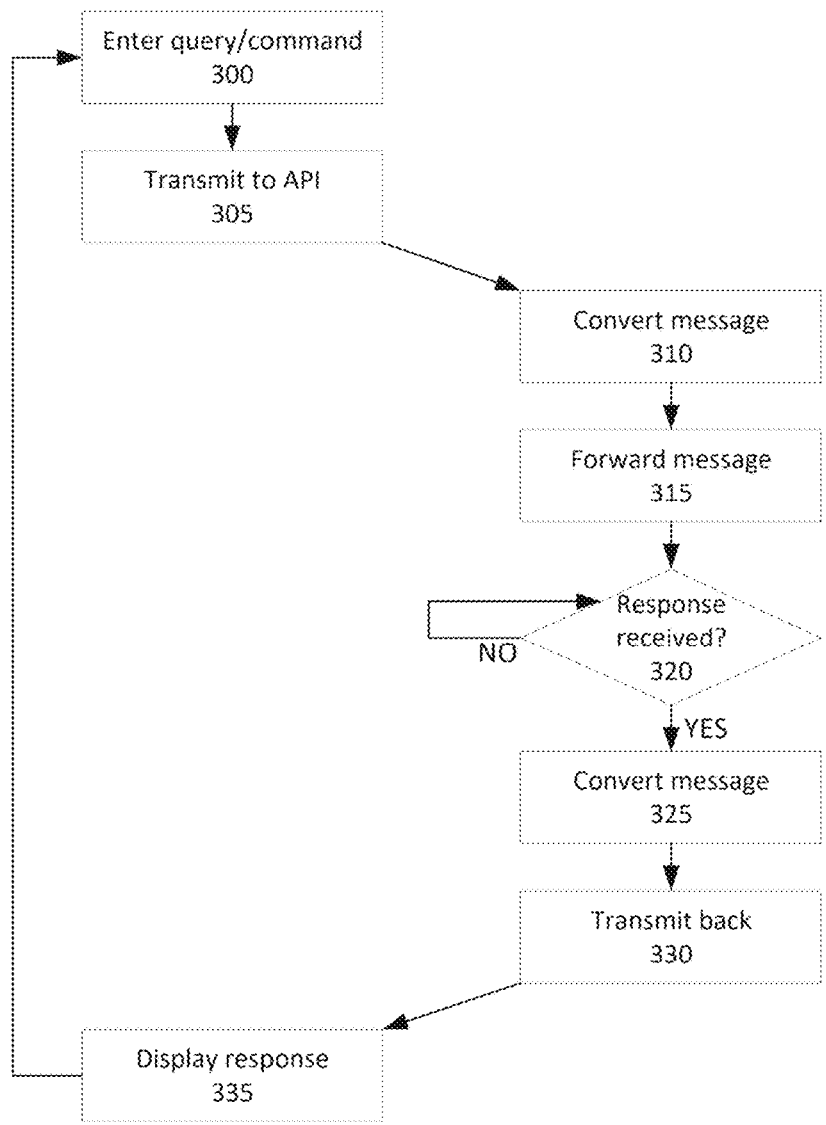
FIG. 3 depicts a method of communication between software modules to facilitate instant-message-based querying and response.

FIG. 3 depicts a method of communication between software modules to facilitate instant-message-based querying and response for the investigation stage described above.

To facilitate communication between the developers' computing devices 120 and the other elements of the system, software on the web server 115 is configured to listen for communications from those computing devices 120, which may come via a variety of messaging protocols.

In some embodiments, the Harmony API is used to intercommunicate between the Skype messaging protocol and various web-based systems. Thus, when a user wants to perform a query or issue a command, they are permitted to enter the information in an unmodified Skype client (Step 300) or other instant messaging application, which sends a message to an address that provides the Harmony API (Step 305) or a similar API capable of receiving messages in the instant messaging protocol. The Harmony API or other API converts the communication to the HTTP protocol (Step 310), forwards the communication to a web-based processing system on the web server 115 (Step 315), and waits for a response (Step 320).

Based on the content of the message, the web server may act by communicating with the API server 110 to request information from the databases 105, or may issue commands to interfaces of devices in the system 100, such as commands to reboot a server, terminate a program, begin running a program, roll back one or more changes to a previous version of the software, shut down a faulty server, change information in a configuration file, add computing capacity or bandwidth, or report status information. Whatever response is received may be edited or redacted into a form acceptable for display in an instant message.

When the web server 115 responds, the response can be converted from HTTP back into the Skype protocol (Step 325) and forwarded to the developer computer 120 (Step 330) for display in the Skype client (Step 335). As a result, users are able to connect to an incident response system using an instant messaging client with which they are familiar and that facilitates communication with other developers. Other clients may be used instead of Skype, so long as an API exists that is capable of bridging the protocols of the client with the web-based protocols used throughout the rest of the system.

However, in a preferred embodiment, a web based user interface is provided that gives additional flexibility (not provided with a native Skype or other instant messaging client) to display information and update the information in real time.

Figure 4:
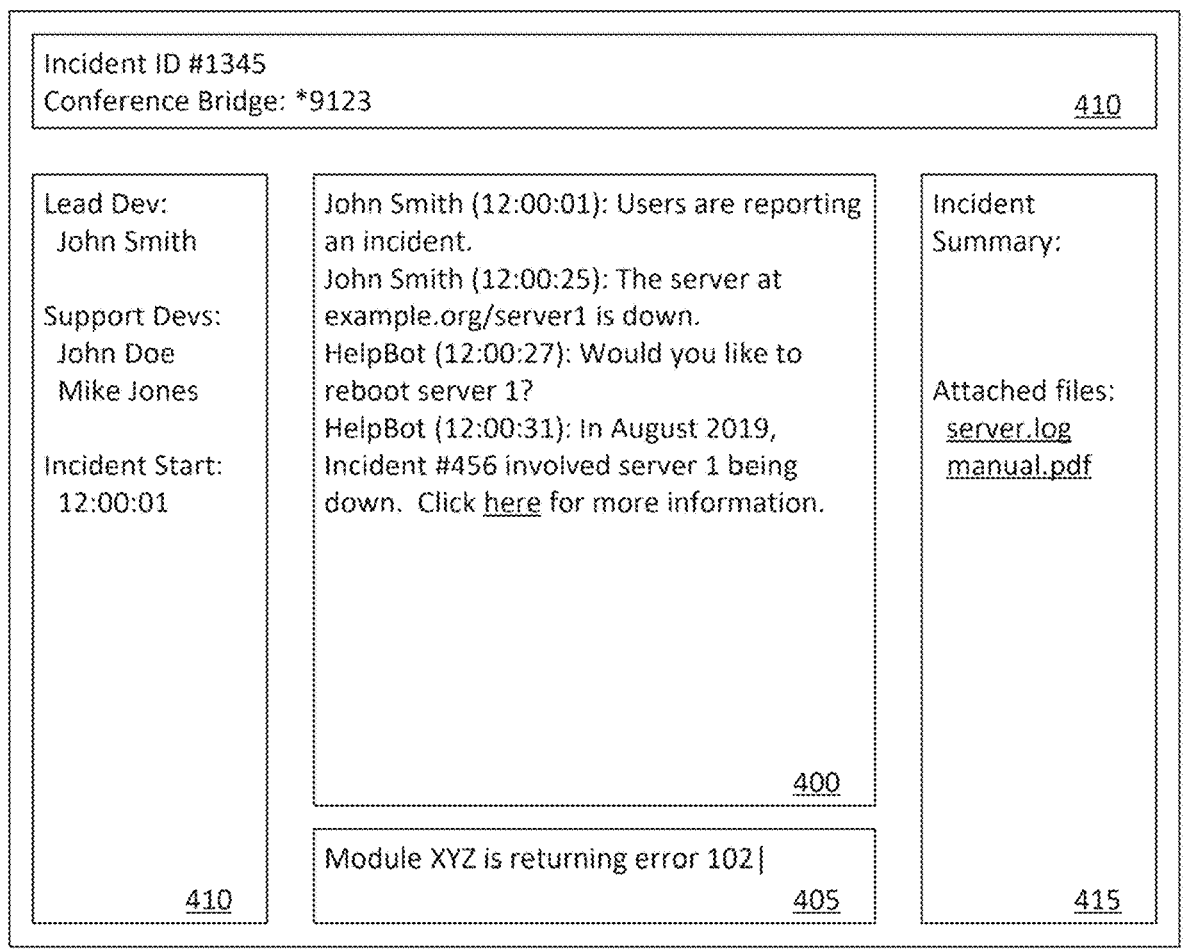
FIG. 4 depicts a user interface for providing queries, receiving responses, and communicating with other human users.

FIG. 4 depicts a user interface for providing queries, receiving responses, and communicating with other human users.

In the center of the user interface, a chat pane 400 displays past messages from the system itself and from other users. A text box 405 below the chat pane 400 is used to enter communications to other users and queries or commands to the system.

One or more summary panes 410 to the left of or above the chat window 400 include (either in a large body or text, or in sub-panes based on topic) information such as the ID number of the incident, a conference number to be used exclusively for discussing the incident if voice communication is necessary, a list of users already involved in the triage and their roles, action and follow-up items, and a timeline including the incident's start time, detection time, diagnosis time, and formal conclusion.

One or more details panes 415 to the right of or below the chat pane 400 include (either in a large body or text, or in sub-panes based on topic) information such as a detailed summary of the incident and its business impact, further text updates as they become available, whether the incident has been linked to a particular recent software update, workstreams currently in progress or completed by developers, updated statistics such as current system latency, and any files that have been attached by one user for other users to view, such as logs, reports, or other documents related to the incident.

Each developer has the ability to communicate in the chat pane 400 in real time with other developers, as well as to issue commands (to be accepted by and acted upon by the REST API described in FIG. 3) as well as to query for pertinent information (as described further below in relation to FIG. 6)

Figure 5:
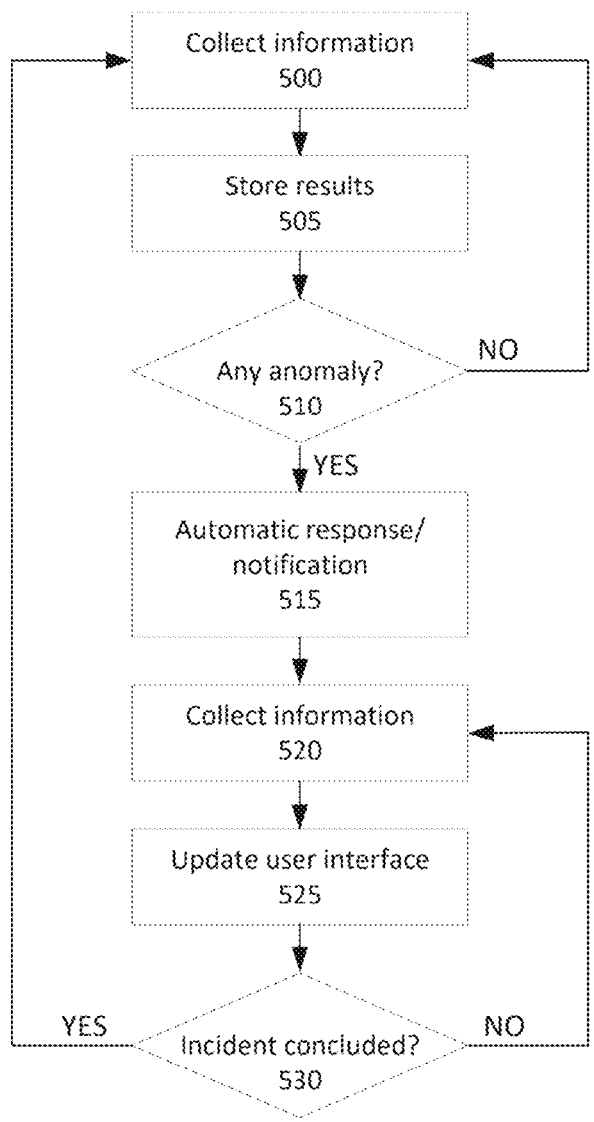
FIG. 5 depicts a method for automatically identifying an anomaly to open an active issue.

FIG. 5 depicts a method for automatically identifying an anomaly to open an active issue.

For any given piece of software in the system, an automated daemon may periodically query the status of the software for various statistics, such as the number of currently connected users, mean time for the server to respond, memory or CPU utilization by the software, number of requests made to the software, or by the software to other libraries or software modules, etc. (Step 500). Alternatively, some of the information may be gathered by an intermediary software module that receives a request for the given piece of software and logs details of the request before forwarding it to the given piece of software.

The information is logged in a long-term memory storage (Step 505). The long-term memory storage may store all the information received, or may process it, such as updating an weighted average value or simplifying the received information into a digest more easily queried for pertinent information.

The current statistics and status information are compared to the historical data to check for possibly anomalous behavior (Step 510). This may include, for example, comparing whether the mean time to respond or resource utilization is much higher than is typical for the time of day and day of week (e.g., that use on a weekend outside of typical work hours is abnormally high, or that mean time to respond is much higher than usual for a weekday during typical business hours), or if the number of connected users is anomalously low for the time of day and day of week, indicating that something may be preventing users from connecting to the system entirely. The system may also take into account more concrete data, such as errors or exceptions being thrown by software and logged by software systems. The system may also take into account a previously received set of service level agreement (SLA) requirements to be met by the system and determine that they are not being met or are in danger of not being met. The system may also treat past usage data to constitute an informal SLA; that is, if the system has historically always had a certain level of responsiveness to user requests during a daily period of high system load (such as during business hours), the system implicitly promises to its users that it will always have an equal level of responsiveness. Finally, the system may be more sensitive to a possible anomaly by being aware of the context software is operating in.

For example, if a new change has occurred in the software, its dependencies, or in the infrastructure on which the software runs, the system may take this information into account and be more likely to consider an apparent error or change in use statistics to be a situation that requires rectification by a systems operator. If no anomaly is detected, the system returns to gathering information (back to Step 500).

If an anomaly is detected, the system may automatically take one or more of a variety of actions (Step 515), including automatically opening up a new incident in the centralized user interface system, automatically adding a set of developers responsible for that software to the incident to begin discussing and analyzing, automatically determining whether any changes to any software modules have occurred since the last time the software did not exhibit the anomaly, or taking predetermined corrective measures, such as forcing a reboot to a server, entering a "safe mode" of operation with changed constraints as to who can use the software or what functionality is enabled in the software, or performing a stored script or series of actions that were performed in response to a problem with the same software in the past. The system may use the user interface to display any automatic discoveries or determinations from automated analysis. The system may also use the user interface to receive and act upon instructions provided by a human user, including an instruction to roll back one or more of the changes to a previous version of the software, to shut down a faulty server, to change information in a configuration file, to add computing capacity or bandwidth, or to shut down or restart a software process.

The system continues to track the statistical behavior of the software (Step 520), updating the user interface of FIG. 4 or any other reporting mechanisms (Step 525) with the new information each time. Developers are thus able to review in real time whether changes they are making during triage or response are helping to improve performance at all. If a developer is satisfied with performance and is convinced that the incident has been addressed, he or she may close the incident. When the system learns that the incident is closed (Step 530), real time updating of the user interface ceases and the system returns to only monitoring. Otherwise, the system continues to update the user interface.

Figure 6:
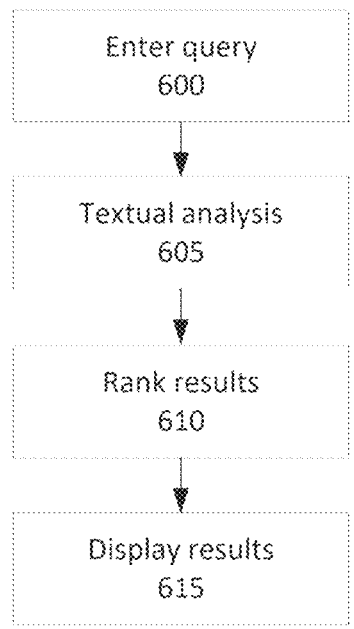
FIG. 6 depicts a method of querying for and delivering relevant data in response to an ongoing anomaly.

FIG. 6 depicts a method of querying for and delivering relevant data in response to an ongoing anomaly.

During an incident, a developer may use the chat pane 400 or another user interface element to enter a query comprising an incident description, such as "Module XYZ is returning error 102 to all requests." (Step 600).

The query may then undergo one or more of a set of textual analyses (Step 605) in order to find one or more best matches. Examples of textual analyses that may be used in various embodiments may include:

Feeding the query into a pretrained neural network, trained by backward and forward propagation of error based on a training data set where typical incident descriptions have already been matched to preferred correct responses to the incident.

Dividing the query into substrings, especially substrings that are already stored in a predetermined list of relevant keywords, such as "Module XYZ" and "error 102," and searching for all stored issues that contain one or more of the same substrings.

Converting the query into an n-dimensional word vector, where n is the number of possible relevant words to be stored in the vector format. For example, if the domain of possible words was {"XYZ", "ABC", "101", "102", "103" }, the description "Module XYZ is returning error 102 to all requests." would be converted to [1, 0, 0, 1, 0], while the description "Module ABC is returning error 101 to all requests." would be convened to [0, 1, 1, 0, 0]. Any metric could then be used to determine the similarity between the vector form of the description and the stored vector forms of previous incidents; in a preferred embodiment, the cosine similarity (i.e., the value of the cosine of the angle between the two vectors in space) is used.

The results of the search are also preferably limited to a particular context (one or more of a particular application name, server name, environment, domain/part of a website/URL, process ID, system ID, particular system credentials, virtual desktop or other virtual machine identifier, any other identifier for an element of software services or means for accessing those software services, or a window of time during which any records were created). This context may be already determinable merely because the textual description of the incident includes the information narrowing it to a particular context (such as "When a user attempts to access example.com, no data is returned") or may be manually entered by a systems operator or automatically determined by the system itself based on current usage statistics or recent software version changes that are likely to be the source of the problem. If little or no information is returned as relevant within the searched context, the context may be expanded—for example, to include other applications that share parts of the code base, rely on same libraries, were developed by the same development team, etc.—in case a similar issue may have been encountered in the past with similar software. In some instances, a searching context may need to be translated from one form to another; for example, one tool may associate stored data with a URL, while another tool may associate stored data with a server name, in which case a search context for a particular URL or server may need to be translated into a functional equivalent compatible with the expectations other systems may have for expressing the context.

A support filter may also be provided in a graphical user interface to systems operators to allow them to alternate between a default view and a secondary view that allows access to filtered data.

The data returned for the query may include past errors, code changes, thrown exceptions, performance issues, system releases, server health checks, or other events or incidents involving software within the given context.

The results of the query are then ranked (Step 610) based on factors which may include relevance (for example, the cosine-similarity metric if vectorization is performed, or the activation level of the final node in the neural network) and date (with more recent possible responses being preferred to older ones).

Finally, the system displays one or more of the highest-ranked results to the user (Step 615) in hopes that the user will be able to implement a same past response or tailor a past response to solve the current issue. By only bringing up historical response data related to the current software module or one reliant on the same externalities, and prioritizing based on the details of the incident, the system makes a complex research task very manageable and possible through a user interface that the user will be using anyway to communicate with other developers. The single interface can be subdivided to retrieve and display information from a variety of resources both physically present or accessible through a network or cloud, including different servers, websites, logs of errors, statuses of assets, and other information. The user interface tracks the context of the issue (the affected server, application, process ID, or other information) and can visually filter and pare down information only to the relevant context, preventing many man-hours of effort searching through lists of data irrelevant to the present context. If the context is changed by a human user, the filtering can re-occur and instantly change the display instead of requiring the human user to re-scan all the lists of information to find what the user is looking for.

Delivery of data to the operator or other user can also occur in parallel using several media. For example, while the centralized user interface is being updated, the system can also generate emails to users (especially users who are not currently logged in and viewing the interface), create new tickets in an issue tracker, and/or use a bot to communicate with users through other channels such as instant messaging or SMS texting.

Figure 7:
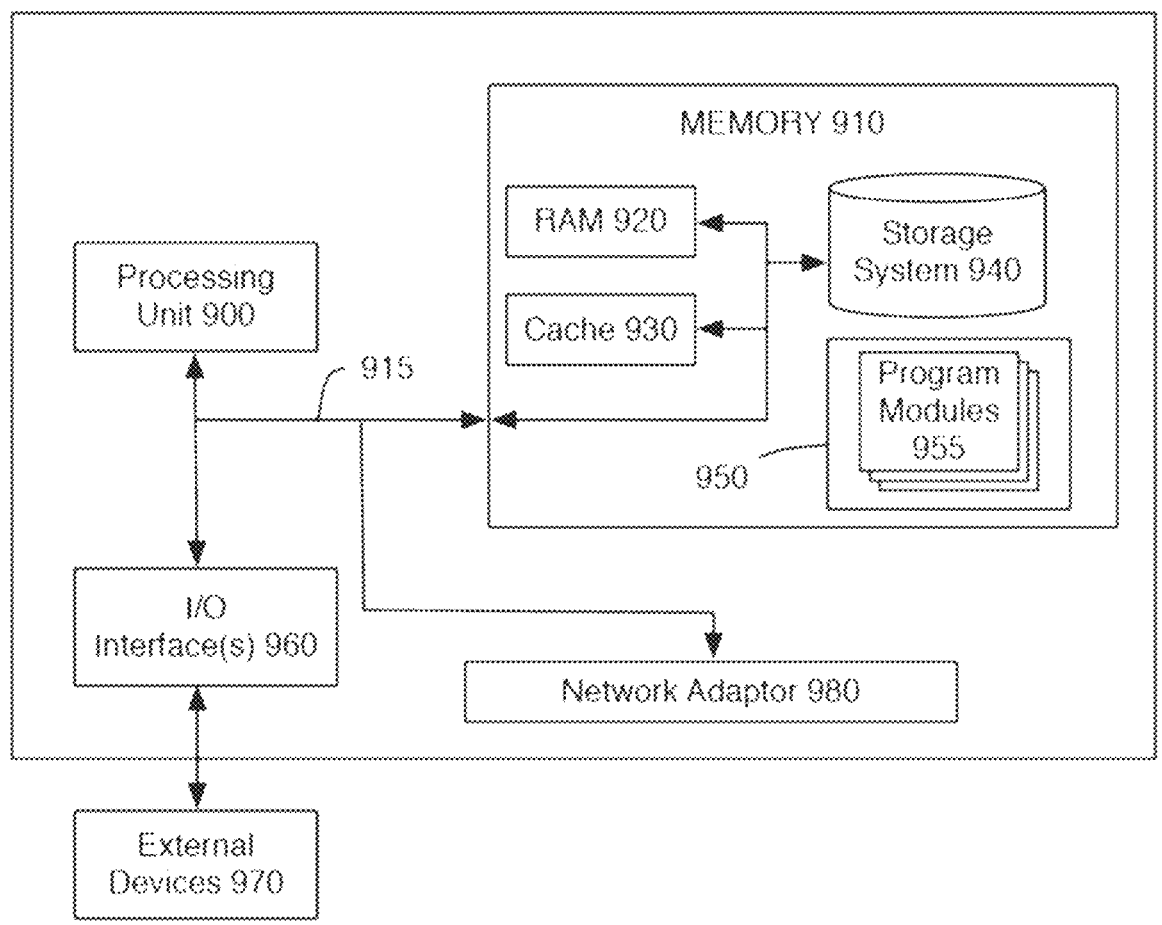
FIG. 7 is a high-level block diagram of a representative computing device that may be utilized to implement various features and processes described herein.

Although FIG. 1 depicts a preferred configuration of computing devices to accomplish the software-implemented methods described above, those methods do not inherently rely on the use of any particular specialized computing devices, as opposed to standard desktop computers and/or web servers. For the purpose of illustrating possible such computing devices, FIG. 7 is a high-level block diagram of a representative computing device that may be utilized for each of the computing devices and/or systems to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A first system for proactively preventing, or facilitating triage and response to, a malfunction in a second system in a connected infrastructure to the first system both comprising a testing environment and a production environment operated in parallel, comprising: one or more processors; and non-transitory memory comprising instructions that, when executed by the one or more processors, cause the one or more processors to: receive a communication indicating a present or possible future disruption to a service provided by a first version of software in the production environment of the second system within user interface (UD), middle or data tier components; determine a prior time when a disruption did not exist in the testing environment: determine a set of changes to software between the testing environment at the prior time and the production environment at a first moment when the disruption was indicated; automatically search historical records regarding similar disruptions to a second version of the software in the testing environment of the first system or the testing environment of the second system and recorded resolutions to the similar disruptions, the historical records being related to one or more of recent code changes, new system errors in the second version of the software, related incidents, performance records, or server health checks return a matching set of historical records indicating a possible response to the present or possible future disruption; and provide an interactive graphical user interface (GUI) to a team of at least two human operators, each human operator simultaneously using different computing devices to access the interactive GUL, to display the matching set of historical records, to log actions already taken to address the present or possible future disruption, to receive commands from the team to make changes to the second system to address the present or possible future disruption, and to display to each human operator communications from another human operator and actions taken by other human operators of the team of at least two human operators.

2. The first system of claim 1, wherein the communication indicating a disruption to a service provided by the second system is generated by one of the one or more processors in response to a statistical anomaly in the performance of the second system compared to past performance.

3. The first system of claim 1, wherein the automatic search limits the provided results to a particular context comprising one or more of a window of time, a set of one or more pertinent software modules, an environment, an application endpoint uniform resource locator (URL), system credentials, or server details, which are shared or relate to the present or possible future disruption.

4. The first system of claim 1, wherein the system enables automated translation from a first machine-readable search context compatible with a first software tool to a second machine-readable search context compatible with a second software tool.

5. The first system of claim 1, wherein a command received from a developer comprises instructions to rollback software on the second system to a previous version, shut down a faulty server, change the information in a configuration file, add capacity, or shut down or restart a software process, and wherein the system automatically performs the instructions.

6. The first system of claim 1, wherein the instructions, when executed by the one or more processors, further cause the one or more processors to:
display through the interactive graphical user interface the determined set of changes,
receive an instruction to roll back one or more changes of the set of changes to a previous version of the software or to a previous configuration of the infrastructure, and responsive to the instruction, automatically roll back the software to the previous version or the infrastructure to the previous configuration.

7. The first system of claim 1, wherein the instructions, when executed by the one or more processors, further cause the one or more processors to:
determine that a same system anomaly had previously occurred in the testing environment, and
prevent software that may cause the same system anomaly from being promoted to the production environment.

8. The flirt system of claim 1, wherein the communication indicating a disruption to a service provided by the second system is provided by a human user, and wherein the search of historical records regarding similar disruptions is performed at least in part based on a text-similarity between the communication provided by the human user and contents of the historical records.

9. The first system of claim 8, wherein the text-similarity is based at least in part on a cosine similarity metric of word vectors into which the communication and the historical record have been converted.

10. A computer-implemented method for proactively preventing, or facilitating triage and response to, a malfunction in a production environment of a system that operates the production environment and a testing environment in parallel, comprising: receiving a communication indicating a disruption to a service provided by a first version of software in the production environment of the system; determining a prior time when the disruption did not exist in the testing environment, determining a set of changes to software between the testing environment at the prior time and the production environment at a first moment when the disruption was indicated; automatically searching historical records regarding similar disruptions to a second version of the software in the testing environment of the system and responses to the similar disruptions; returning a matching set of historical records indicating a possible response to the disruption related to recent changes, new system errors, related incidents, performance records, recorded resolutions, or server health checks in the testing environment; and providing an interactive graphical user interface (GUI) to a team of at least two human operators, each human operator simultaneously using different computing devices to access the interactive GUE, to display the matching set of historical records, to log actions already taken to address the disruption, to receive commands from the team to make changes to the system to address the disruption, and to display to each human operator communications from another human operator and actions taken by other human operators of the team of at least two human operators.

11. The computer-implemented method of claim 10, wherein the communication indicating a disruption to a service provided by the system is automatically generated by a computer in response to a statistical anomaly in the performance of the system compared to past performance.

12. The computer-implemented method of claim 10, wherein each previously identified anomaly is stored for future tracking with its software version to allow for searching for errors associated with the same software version when a future anomaly occurs.

13. The computer-implemented method of claim 10, wherein the automatic search limits the provided results to a particular context comprising a window of time and a set of one or more pertinent software modules.

14. The computer-implemented method of claim 10, wherein a command received from an operator comprises instructions to rollback software on the system to a previous version, and wherein the system automatically performs the command.

15. The computer-implemented method of claim 10, further comprising:
displaying through the interactive graphical user interface the determined set of changes,
receiving an instruction to roll back one or more changes of the determined set of changes to a previous version of the software, shut down a faulty server, change information in a configuration file, add capacity, or shut down or restart a software process, and
responsive to the instruction, automatically performing what has been instructed.

16. The computer-implemented method of claim 10, further comprising:
determining that a same system anomaly had previously occurred in the testing environment; and
preventing software that may cause the same system anomaly from being promoted to the production environment.

17. The computer-implemented method of claim 10, wherein the communication indicating a disruption to a service provided by the system is provided by a human user, and wherein the search of historical records regarding similar disruptions is performed at least in part based on a text-similarity between the communication provided by the human user and contents of the historical records.

18. The computer-implemented method of claim 17, wherein the text-similarity is based at least in part on a cosine similarity metric of word vectors into which the communication and the historical record have been converted, and wherein results are further optimized based on success rate of usage of resolution of data, recent change activities and similar application context components activities.

19. A computer-implemented method for facilitating triage and response to a system's malfunction, comprising:
calculating an informal set of SLA requirements based on average responsiveness of the system during a daily period of high system load;
automatically determining that an anomaly in system behavior at runtime indicates the informal set of SLA requirements are not being met or are in danger of not being met due to a disruption to a service provided by the system;
automatically searching historical records regarding similar disruptions to the system and responses to the similar disruptions;
returning a matching set of historical records indicating a possible response to the disruption; and
providing an interactive graphical user interface to display the matching set of historical records, to log actions already taken to address the disruption, and to receive commands from multiple developers to make changes to the system to address the disruption.

* * * * *